United States Patent [19]

Protonantis

[11] 4,007,438
[45] Feb. 8, 1977

[54] SPEED MONITORING AND TICKETING SYSTEM FOR A MOTOR VEHICLE

[76] Inventor: Peter N. Protonantis, 2164 Hendrison St., Brooklyn, N.Y. 11234

[22] Filed: Aug. 15, 1975

[21] Appl. No.: 604,912

[52] U.S. Cl. .................................. 340/62; 340/53; 340/263; 180/105 E
[51] Int. Cl.² ........................................ B60Q 1/54
[58] Field of Search .............. 340/53, 62, 263; 307/10 R; 180/98, 105 R, 105 E, 106, 107, 110

[56] References Cited
UNITED STATES PATENTS

| | | | |
|---|---|---|---|
| 3,597,730 | 8/1971 | McClellan | 340/62 |
| 3,732,539 | 5/1973 | Easterly | 340/62 |
| 3,823,383 | 7/1974 | Mallinger | 340/62 |

*Primary Examiner*—Alvin H. Waring
*Attorney, Agent, or Firm*—Kirschstein, Kirschstein, Ottinger & Frank

[57] ABSTRACT

A motor vehicle speed monitoring and ticketing system visually indicates when a speed limit has been exceeded. The driver is required to register as a violator before the indicator can be de-energized.

11 Claims, 9 Drawing Figures

FIG. 5
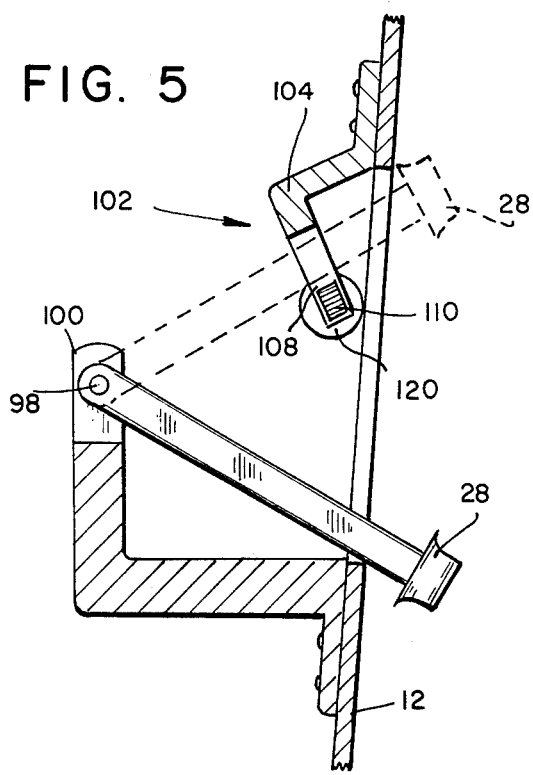
FIG. 6
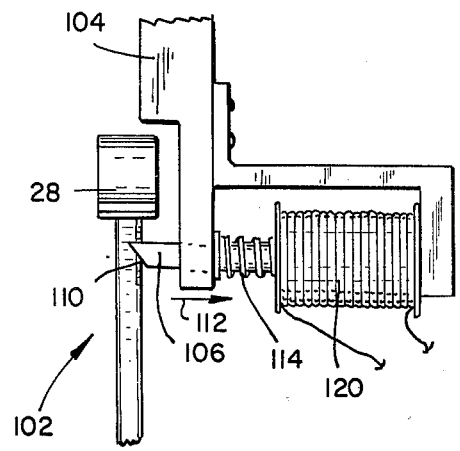
FIG. 7
FIG. 9
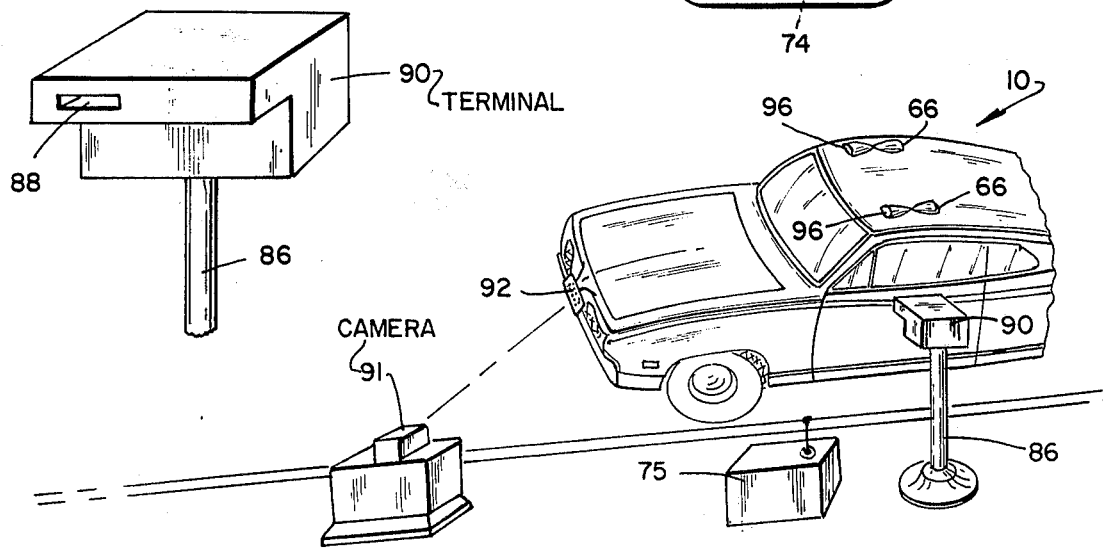
FIG. 8

SPEED MONITORING AND TICKETING SYSTEM FOR A MOTOR VEHICLE

BACKGROUND OF THE INVENTION

1. Field of the Invention

The invention relates to a speed monitoring and ticketing system for a motor vehicle and more particularly to a speed monitoring system which will visually indicate when a speed limit has been broken and which may be selectively changed from a low to a high speed limit and wherein the driver will be required to register as a violator before the visual indicator can be de-energized.

2. Prior Art

Devices adapted for use with motor vehicles to indicate and record when the motor vehicle has exceeded a set speed limit are known.

For example, the patent to Carter et al. U.S. Pat. No. 3,203,501 discloses an automotive speed control system wherein the speed of the motor vehicle is monitored and if it surpasses a set limit, a violation indicator is activated. When the device determines that the driver has broken the speed limit, the device shuts off the engine for a period of time. When this punishment period has elapsed, the system permits the engine to be re-started. A counter records the number of violations and the punishment period increases in length as the number of violations increase. A manual reset control and the control which sets the speed limit are locked in a box within the vehicle. The speed limit can be varied only by gaining access to the speed limit control which is positioned in the locked box. Further, the timing circuitry required is rather elaborate.

Another device is disclosed in the Brenner U.S. Pat. No. 3,229,249 and is responsive to a signal from a roadside transmitter to set the permitted vehicle speed. When the speed limit is broken, the system will energize an external light on the vehicle. In this device a radio receiver must be placed in the motor vehicle and a roadside transmitter is required whenever the speed limit changes. The cost of installing roadside transmitters and protecting them from vandalism is considerable.

It is toward elimination of these and other problems that the present invention is directed.

SUMMARY OF THE INVENTION

1. Purposes of the Invention

It is an object of the present invention to provide a speed monitoring device which will indicate when the motor vehicle has exceeded a predetermined speed limit.

Another object of the present invention is to provide a speed monitoring device which can be changed from a low speed limit to a high speed limit to conform to changing official speed limits.

Still another object of the present invention is to provide a speed monitoring device which can be changed from a low to a high speed limit by the driver of the motor vehicle.

Yet another object of the present invention is to provide a monitoring system wherein a violation indicator mounted externally on the vehicle is energized upon the violation of a speed limit and can be de-energized only be a predetermined signal.

A further object of the present invention is to provide a speed monitoring device and ticketing system wherein the driver who has violated the speed limit must report to a predetermined location in order to de-energize the violation indicator, at which time he must identify himself the the purposes of receiving a ticket.

A still further object of the present invention is to provide a speed monitoring and ticketing system which is easily and economically manufactured and which can be easily installed as an after market device in a motor vehicle.

2. Brief Description of the Invention

Generally, the foregoing and other objects are achieved by positioning two sets of circuit closing elements or switches on the vehicle speedometer. One set of switches are mounted at a low speed limit and the other set are mounted at a high speed limit. Each group of switches is responsive to the indicator approaching and exceeding the associated speed limit.

Means are provided for selecting the speed limit which is to govern the control of the car. Generally, in congested areas the low speed limit controls the vehicle's speed and in uncongested areas the high speed limit controls. In its first position the selector places the first group of switches in circuit with a warning circuit and a violation indicator circuit. As the vehicle speed approaches the low speed limit, one of the switches in the first group is closed by the indicator, thereby energizing the warning circuit notifying the driver that he is approaching the speed limit. As the speed of the vehicle goes beyond the low speed limit, the other switch is closed, thereby causing a violation indicator mounted externally on the vehicle to be energized to provide an external indication that there has been a violation of the low speed limit. When the vehicle speed is reduced the circuit closing elements will open, however, the violation indicator will remain energized. The violation indicator can be de-energized only by activating a signal responsive circuit breaking means by a predetermined signal. When the selector is placed in the second position, the second group of switches are placed in circuit with the warning and violation indicator circuit and the first group is isolated therefrom. The method of operation of the second group is identical to that of the first group.

A means is provided externally on the motor vehicle to indicate when the selector is placed in the second position.

Further, a means is provided to lock the selector in the second position when it is moved from the first to the second position requiring that the vehicle reach a predetermined speed intermediate the low and high speed limits before the selector may be returned to the first position.

Since the violation indicator can be de-energized only by activating the signal responsive circuit breaking means, the driver must take the vehicle after a speeding infraction to a registration station where a signal generating means will emit the proper signal to interrupt the violation indicator circuit. The driver will be required to register for the purposes of receiving a ticket. The registration station may be manned by law enforcement personnel or may be activated by the driver automatically. If the driver attempts to avoid going to the registration station, the energized violation indicator can be spotted by law enforcement officials who can issue a speeding ticket.

The invention consists in the features of construction and arrangement of parts which will be detailed hereinafter and described in the appended claims.

BRIEF DESCRIPTION OF THE DRAWINGS

For a better understanding of the present invention, reference should be had to the accompanying drawings, wherein like numerals of reference indicate similar parts throughout the several views and wherein:

FIG. 5 is an enlarged sectional view taken substantially along the line 5—5 of FIG. 2;

FIG. 6 is an enlarged view of the locking mechanism in accordance with the present invention;

FIG. 7 is a front view of an identification card;

FIG. 8 is a perspective view of an unmanned registration station; and

FIG. 9 is a perspective view of the registration station terminal shown in FIG. 8.

DESCRIPTION OF THE PREFERRED EMBODIMENT

Figure 1:
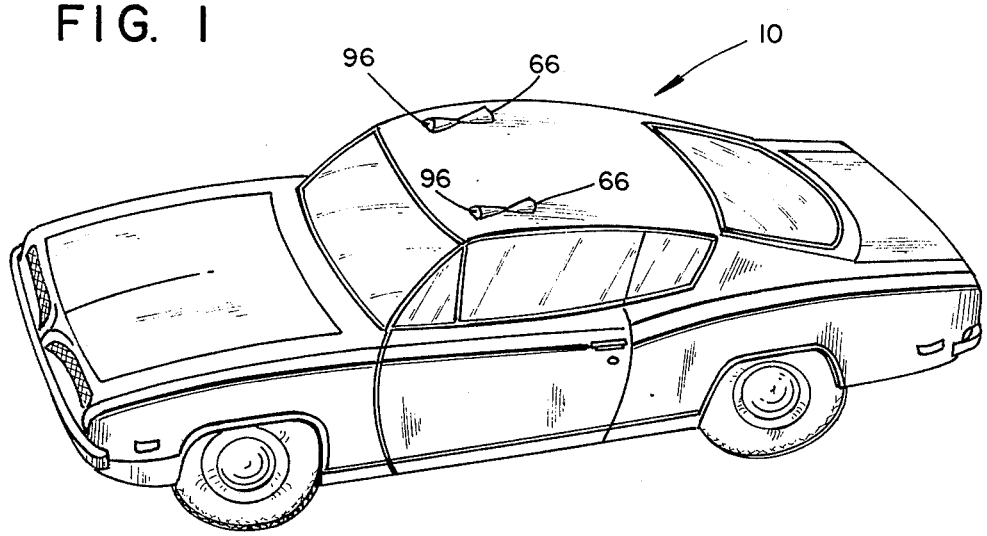
FIG. 1 is a perspective view of a motor vehicle having a speed monitoring system in accordance with the present invention mounted therein.
Figure 2:
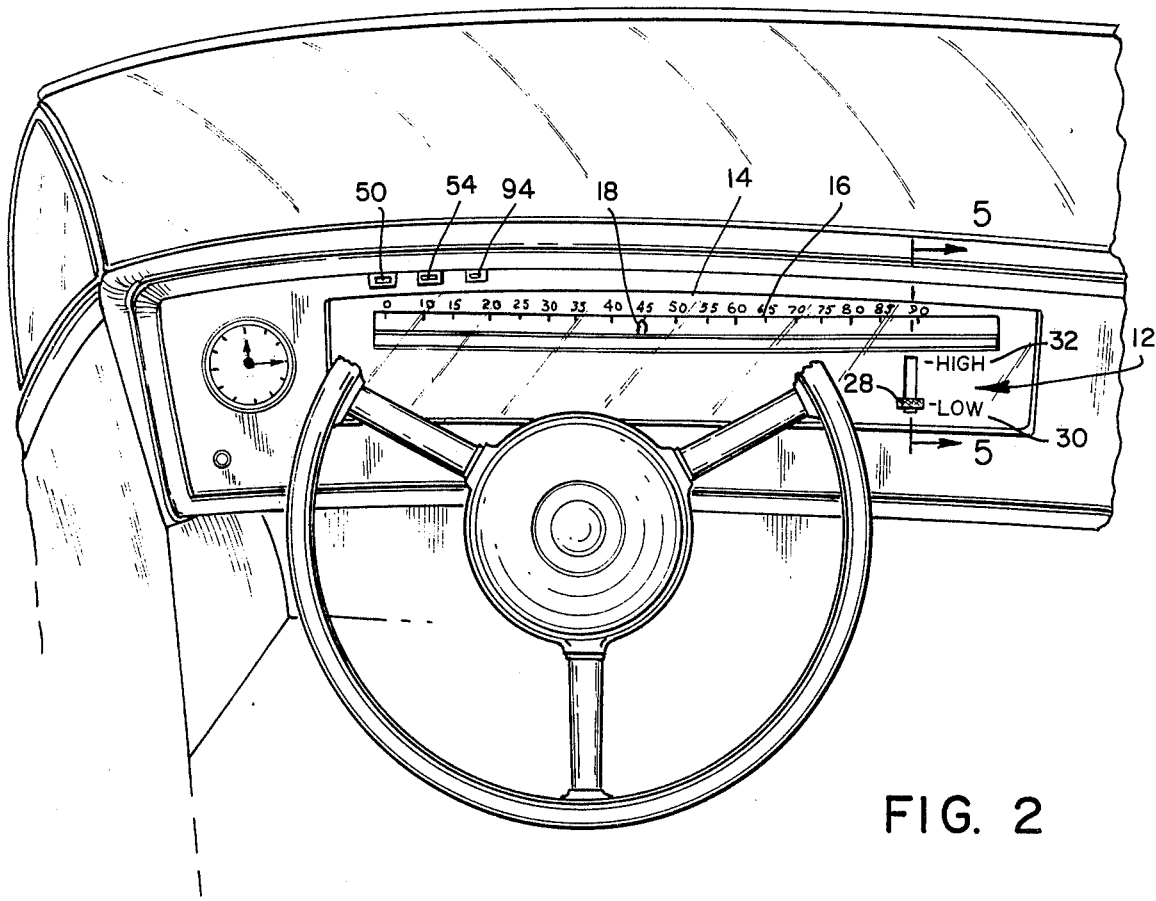
FIG. 2 is an enlarged view of a portion of the dashboard of the motor vehicle.

With reference to the drawings, there is illustrated in FIG. 1 a motor vehicle 10 having a speed monitoring system in accordance with the present invention mounted therein. The dashboard or instrument panel 12 of the motor vehicle 10 is shown in FIG. 2 and is equipped with the standard instrumentation including a speedometer 14 having a calibrated scale 16 with numerical indicia thereon and a movable indicator 18 to show the speed of the motor vehicle on the calibrated scale. While the speedometer 14 is illustrated as being of the horizontal bar type, it is to be understood that the present invention can be utilized with a speedometer having any conventional configuration.

A brief explanation of the operation of the system will place the detailed discussion to follow in proper perspective.

Basically, the speed monitoring device is responsive to the speed of the motor vehicle. Generally, in urban and heavily congested areas, the established speed limit is approximately 30 miles per hour (mph) and will not exceed 40 mph. In rural areas, less congested areas and highways the speed limit is usually higher. The speed monitoring system in accordance with the present invention can be placed in one of two modes of operation to accommodate this variation in speed limits. In the first mode the system will detect when the driver has exceeded the low speed limit, and in the second mode, will detect when the driver has exceeded the high speed limit. For the purposes of the following description, the low speed limit will be assumed to be 40 mph and the high speed limit will be assumed to be 65 mph. It is to be understood that these specific speed limitations are solely for means of illustration only and that the speed monitoring system will function at different speed limits other than those set forth.

As the motor vehicle approaches either the low or high speed limit, a warning system activated by the speedometer will give notice to the driver that he is approaching the particular speed limit. Upon breaching the speed limit, a violation indicator on the exterior of the motor vehicle is energized to provide external visual evidence that the driver has broken the speed limit. The violation indicator can not be de-energized if the driver slows down. It will only be interrupted when a signal responsive circuit breaking means is activated by a predetermined transmitted signal. Thus, the driver is forced to proceed to a registration station for the purpose of registering as a violator and having the violation indicator de-energized. Since the violation indicator remains energized if the driver does not proceed to the registration station, he may be stopped by law enforcement officials and issued a ticket.

Figure 3:
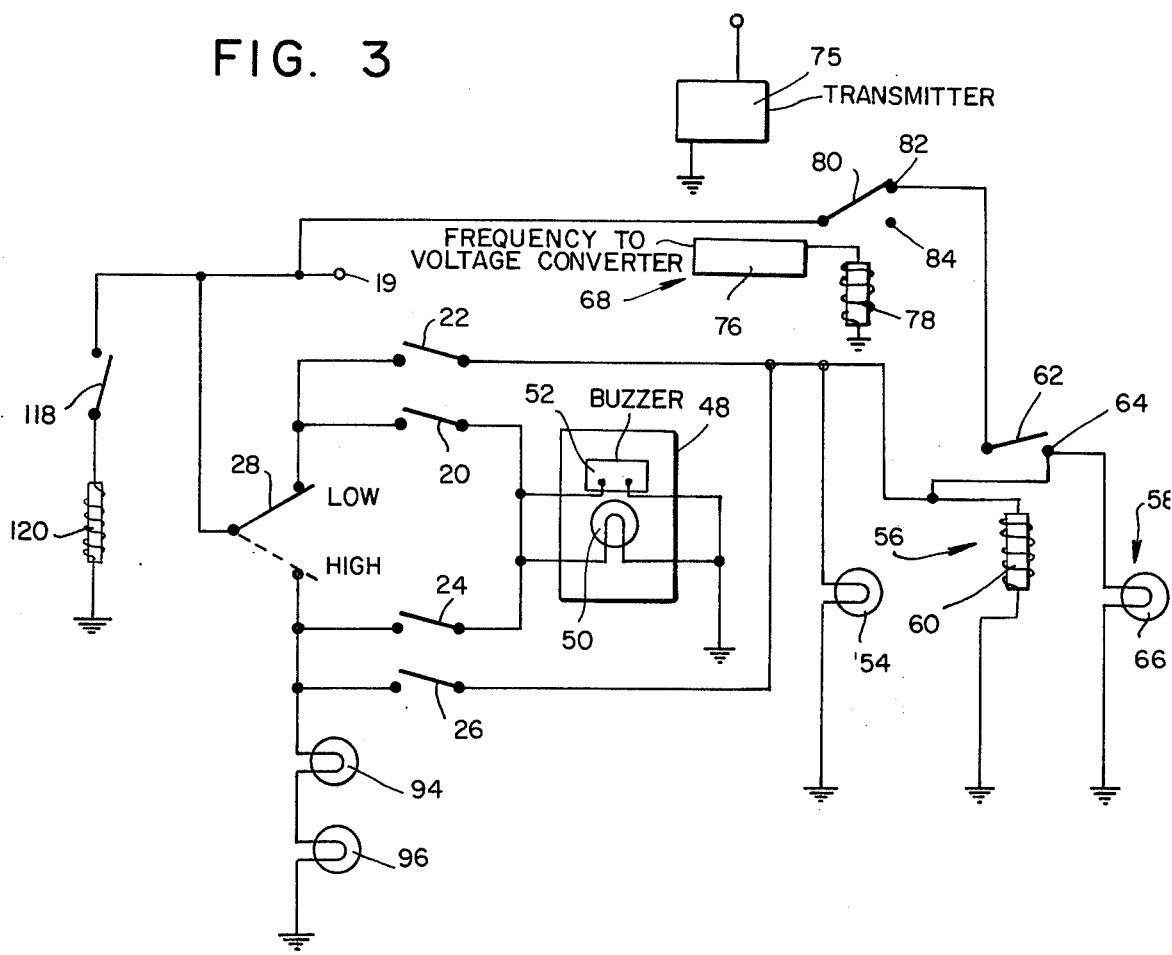
FIG. 3 is a circuit diagram of the system in accordance with the present invention.

As can be seen in FIG. 3, the warning and violation indicator circuits to be hereinafter described are energized from the motor vehicle electrical system. The connection can be made at any point not readily accessible and is identified by terminal 19. Further, the circuit elements, excluding those specifically described as being positioned elsewhere on the motor vehicle may be positioned within a locked housing to prevent tampering.

Positioned on the speedometer are two sets or groups of circuit closing elements. While the circuit closing elements will be described hereinafter as switches, it will be appreciated that other types of circuit closing elements which will close in response to the positioning of the indicator on the speedometer can be utilized. Group I consists of a first switch 20 and a second switch 22 and Group II consists of a third switch 24 and a fourth switch 26. On switch of each group, namely, the first and third switches 20 and 24, is intended to close a circuit to activate a warning circuit and the other switches in each group, namely, the second and fourth switches 22 and 26, is intended to close a circuit to activate a violation indicator circuit.

As mentioned hereinabove, the low speed limit is assumed to be 40 mph, and the high speed limit is assumed to be 65 mph. The first switch 20 is positioned at a point in the path of the speedometer indicator 18 before the second switch 22. The spacing of the first switch 20 from the second switch 22 provides for a period during which the driver is warned that he is approaching the speed limit. Preferably, this range corresponds to a 5 mph interval. If the second switch 22 is positioned at the numerical indicium 40 the first switch 20 will be positioned at the numerical indicium 35. Similarly, if the fourth switch 26 is positioned at the numerical indicium 65, the third switch 24 is positioned at the numerical indicium 60.

In order that the speed monitoring system may accommodate variations in the speed limits, the system can be placed in one of two modes of operation. The driver of the motor vehicle through the use of a selector means in the form of a lever 28 placed on the dashboard 12 pivots the lever 28 between a first and a second position. In its first position the system will respond to a violation of the low speed limit and in its second position the system will respond to a violation of the high speed limit. Indicia 30 and 32 may indicate to the driver which mode of operation the system is in.

With reference to FIG. 3, when the lever 28 is placed in its first position, the first and second switches 20 and 22 will control the operation of the warning and violation indicator circuits which will hereinafter be described. As the selector 28 is moved to its second position (shown in phantom lines) the first and second switches 20 and 22 will be isolated from the circuit and the third and fourth switches 24 and 26 will then control the operation of the circuits.

Figure 4:
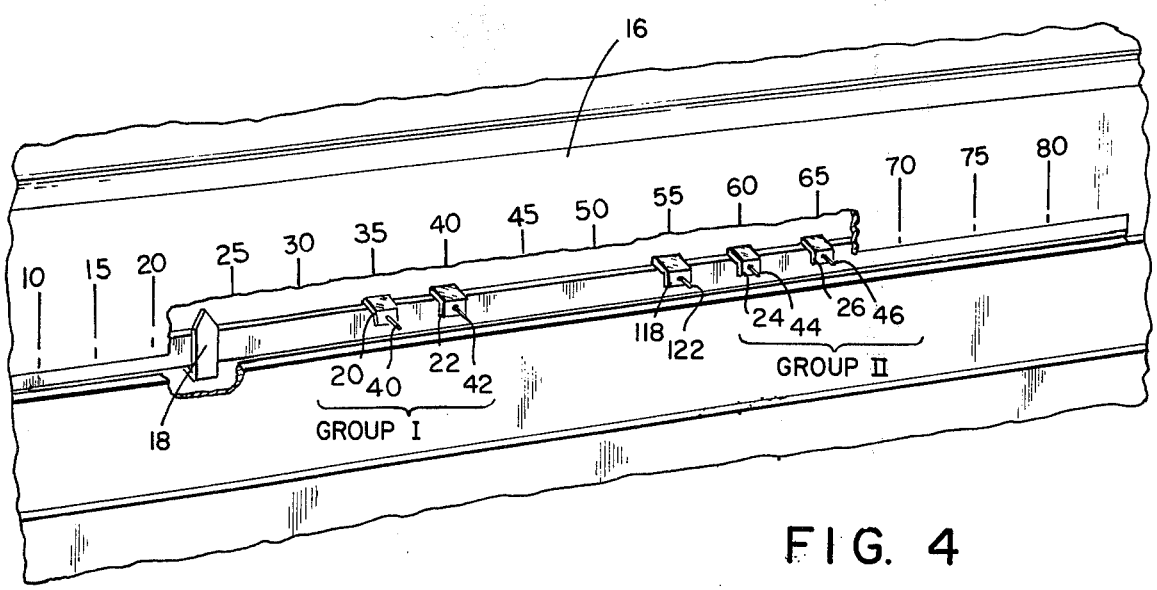
FIG. 4 is an enlarged detailed view of a portion of the motor vehicle speedometer at angle to show circuit closing means and speed indicator.

As shown in FIG. 4, when the selector 28 is in its first position, as the vehicle speed passes 35 mph the indicator 18 will strike the trigger 40 of the first switch 20, closing the first switch 20. As can be seen in FIG. 3 when the first switch 20 is closed, a warning means 48 consisting of a warning light 50 and a warning buzzer 52 will be energized. The warning circuit 48 is energized to provide visual and auditory indications to the driver that the speed of the motor vehicle is approaching the low speed limit. The warning light 50 is positioned on the dashboard 12 within the field of vision of the driver and is preferably yellow. Once the vehicle speed reaches 40 mph the indicator 18 will strike the trigger 42 on the second switch 22 thereby closing the switch. When the switch is closed the violation light 54 preferably red, positioned on the dashboard is energized and a switching means is closed. The switching means may be a relay or other means which will close a circuit when switch 22 is closed.

When the switch means 56 is energized, the violation indicator means 58 is energized, resulting in the energization of a violation indicator or light 66 which is mounted on the exterior of the motor vehicle. While the light 66 is illustrated as being on the roof of the motor vehicle, it will be appreciated that it can be placed at other locations on the exterior of the motor vehicle. If the driver reduces the speed to below 40 mph, the violation indicator means 58 will remain energized.

When switching means 56 is closed, the violation indicator means 58 is energized. If the switching means 56 is a relay 60, when the relay 60 is energized, the contact arm 62 will be brought into contact with terminal 64. Thus, the violation indicator means 58 or light 66 will be energized. Current can flow through switch 22 or the contact arm 62. If the driver reduces his speed thereby opening switch 22, the relay 60 will still be energized since the current will still flow from the terminal 19 through the contact arm 62. The light 66 will remain energized.

The violation indicator circuit, once energized can only be de-energized by activating the signal responsive circuit breaking means 68 in a manner which will hereinafter be described.

When the selector 30 is in its second position (phantom lines in FIG. 3) the first and second switches 20 ans 22 are isolated from the system so that as the vehicle speed increases past 40 mph, the warning and violation indicator circuits will not be energized. The vehicle speed must pass 60 mph at which time the trigger 44 on the third switch 24 is contacted by the indicator 18. The third switch 24 is closed resulting in the warning light 50 and the warning buzzer 52 being activated. When the vehicle speed surpasses 65 mph the indicator 18 will have moved a trigger 46 on the fourth switch 26 thereby closing the fourth switch 26 and energizing the light 54 and switching means 56, resulting in the energization of the violation indicator means 58.

It will be appreciated that roadside signs may be provided to apprise the driver of the proper position in which the selector should be placed. For example, on the entrance road to a highway, the vehicle will be moving from a road where traffic is controlled by the low speed limit to the highway where, generally, the traffic is controlled by the high speed limit. A sign is provided to inform the driver that he is approaching the highway controlled by the high speed limit and to instruct the driver to move the selector from the first to the second position so that the system will indicate a violation of the high speed limit only, as described hereinabove. Similarly, on the exit road of a highway, when the vehicle will be moving from a road where the traffic is controlled by the high speed limit to a road where the traffic is controlled by the low speed limit, a sign will instruct the driver to place the selector in the first position so that the system will indicate a violation of the lower speed limit.

Further signs may be placed along the roads to continually apprise the driver of the proper positioning of the selector.

In order for the violation indicator to be de-energized, it is necessary for the driver to proceed to a registration station. The registration station may be positioned at several convenient locations in the community on the exits or entrances to highways, and in addition, may be positioned adjacent to toll booths on toll roads.

At the registration station the driver will be required to identify himself for the purpose of receiving a ticket. FIG. 7 shows one form of identification card 70 which may bear the photograph 72 of the driver and in addition, vital information 74 inculding his name, address, and license number. If the registration station is manned, (not illustrated) the attendant will take the identification card and will prepare a ticket from the information thereon. In addition, the attendant will activate a transmitter which will momentarily emit a signal to activate the circuit breaking means 68 interrupting the violation indicator circuit 58 The transmitter 75 is basically a standard frequency signal emitter in general use and need not be described in detail for an understanding of the present invention. The circuit breaking means 68 is a frequency to voltage converter 76 which, when it receives the transmitted signal, will energize the relay 78 resulting in the contact arm 80 moving from terminal 82 to 84, thus interrupting the circuit to light 66. Once the circuit is interrupted, the relay 60 will open, resulting in contact 62 separating from terminal 64. Upon termination of the transmitted signal, the relay 78 is de-energized and contact arm 62 returns to terminal 82. The violation indicator is thereby ready to register another speeding violation.

As shown in FIG. 8, the registration station may be unmanned in which case the driver positions the automobile alongside a stand 86, on the shoulder of the road. The driver then inserts the indentification card 70 into a slot 88 in the terminal 90. The identification card may be similar to cards peresently used for credit purposes. The vital information is magnetically coded so that when the card is inserted into the slot 88, the information is read by scanning system (not shown). The method of scanning cards containing coded information thereon is well-known in the art and will not be described in detail herein. The scanning system will relay the vital information from the terminal to a central station. A ticket for the speeding violation will then be issued based on the information on the information card.

When the identification card is inserted into the slot 88, the transmitter 75 will emit a signal of a predetermined frequency which will activate the circuit breaking means to interrupt the violation indicator current as hereinabove described.

In addition, a camera 91 may be provided to photograph the license plate 92 on the motor vehicle.

In an alternative embodiment, in order to apprise the driver that the lever 28 is in the second position, a lamp 94 may be provided on the dashboard which will be energized when the lever is so positioned.

To prevent inscrupulous drivers from operating in a low limit speed zone with the selector means in the second position, indicating means, preferably a light 96 positioned externally of the vehicle being of a different color than the violation indicator 66 may be provided which will be energized once the driver places the selector in the second position. In this manner, law enforcement officials can readily ascertain when a driver is driving with the selector in the second position when it should be in the first position.

As mentioned hereinabove, lever 28 has a first and a second position which will determine the mode of operation of the speed monitoring system. To deter the driver from placing the speed monitoring system so that the high speed limit will govern operation of the car when he is in a location where the low speed limit should govern, locking means are provided for the lever 28 responsive to the motor vehicle speed. As shown in FIG. 5, the lever 28 is pivoted at one end on a pivot pin 98 which attaches the lever to a supporting element 100 secured to the motor vehicle behind the dashboard 12. The supporting element 100 may be a portion of the internal frame of vehicle 10. When the lever 28 is moved to its second position (shown in phantom lines) the lever will be caught by a lock mechanism 102. The lock mechanism 102 consists of a bracket 104 which is securely fastened to the back of the dashboard 12. A movable latch 106 is positioned at the end of the bracket 104 and has a normal position projecting above the surface 108 of the bracket 104 in the path of the lever. As the lever is moved to its second position, the lever bears against the camming surface 110 on the movable latch 106 and will urge the latch in the direction of arrow 112 in FIG. 6. When the lever has reached the second position, it will have passed over the latch and the latch will be returned to its normal position by spring 114. The lever will be trapped on the bracket thereby preventing the driver from moving the lever back to its first position.

As mentioned hereinabove, when the lever 28 is in the second position, a light 96 is energized. If the driver is operating the motor vehicle in a low speed zone, law enforcement officials will be put on notice by the light 96 that the high speed limit is governing the operation of the warning and violation indicator systems and they can then take whatever steps they deem necessary.

To return the lever to the first position the motor vehicle must reach a predetermined speed. A fifth switch 118 which is identical to the switches disclosed hereinabove is positioned on the speedometer at a vehicle speed intermediate the low and the high speed limit. The switch 118 is illustrated as being positioned at the indicium 55, for the purpose of illustration only.

The switch 118 is in circuit with a solenoid 120 which is energized from terminal 19. When the motor vehicle speed exceeds 55 mph the indicator 18 will hit the trigger 122 on the switch 118 closing the switch 118. The solenoid 120 which will be energized will retract the latch 106 from the path of the lever 28 so that the lever may be moved to its first position. If the speed of the motor vehicle drops below 55 mph, the indicator 18 will open the switch 118, thereby de-energizing the solenoid 120 and the latch will return to its normal position on the bracket 104.

Therefore, in order for the driver to return the lever to its first position, it will be necessary for him to speed in which case he runs the risk of being caught.

For the switches hereinabove described the force needed to display the triggers is not significantly large, therefore, no modification of the standard speedometer is necessary. The speedometer indicator has sufficient force to effectively displace the triggers. The switch can thus be easily mounted as an after market device on motor vehicles which were not originally manufactured with them in place. Therefore, the speed monitoring system in accordance with the present invention can be easily installed in older motor vehicles.

It can be seen from the foregoing detailed description that the object of the present invention, namely, to create a speed monitoring and ticketing system for a motor vehicle has been achieved by positioning two groups of switches on the speedometer of a motor vehicle. One group is associated with a low speed limit and the other group is associated with a high speed limit. The two groups of switches are provided to permit the changing from a low speed limit to a high speed limit. The change from the low to the high speed limit is made by the driver using a selector. The switches are adapted to be closed by the speedometer indicator which changes its position on the speedometer to visually indicate the speed of the motor vehicle.

When the selector is placed in a first position, the switches at the low speed limit when closed, will activate a warning circuit and a violation indicator circuit in the motor vehicle. One of the switches will be closed as the vehicle reaches a speed slightly less than the speed limit to activate the warning circuit. As the vehicle speed breaches the low speed limit, the other switch closes and a violation indicator circuit with a violation indicator mounted externally on the vehicle will be energized. The violation indicator circuit remains energized even if the vehicle speed is reduced below the speed limit and can be de-energized only by subjecting a signal response circuit breaking means in the violation indicator circuit to a predetermined transmitted signal.

When the selector is placed in its second position, the first group of switches is isolated and the warning and violation indicator circuits will be energized only when the speedometer indicator approaches and passes the second group of switches.

A locking means is provided to lock the selector in the second position when the selector is moved from the first to the second position. The vehicle must reach a predetermined speed intermediate the low and high speed limits before the selector may be returned to the first position.

Indicator means positioned externally on the vehicle may also be provided to indicate when the selector is placed in the second position. To de-energize the violation indicator circuit, the driver must proceed to a registration station. At the station, a transmitter will emit a signal to activate the circuit breaking means thereby interrupting and de-energizing the violation indicator circuit. Further, the driver will be required to register as a violator. The violation may be manned or may be automatically controlled by the driver. If the driver does not proceed to the registration station after the speeding infraction, the violation indicator will be in clear view of law enforcement officials who can then issue a ticket to the driver.

What is claimed is:

1. A speed monitoring system for a motor vehicle comprising:
   a. a speedometer fixedly mounted within said motor vehicle having a calibrated scale and a movable indicator adapted to visually indicate the speed of said motor vehicle by changing its position on said scale;
   b. a source of electrical energy within said motor vehicle;
   c. a first circuit closing element adapted to be opened and closed by said movable indicator;
   d. a second circuit closing element adapted to be opened and closed by said movable indicator, said first and second circuit closing elements forming a first group;
   e. a third circuit closing element adapted to be opened and closed by said movable indicator;
   f. a fourth circuit closing element adapted to be opened and closed by said movable indicator, said third and fourth circuit closing elements forming a second group, said first group being associated with a low speed limit and said second group being associated with a high speed limit;
   g. a warning circuit energized by said source of electrical energy when said first or said third circuit closing element is closed;
   h. a violation indicator mounted externally on said motor vehicle adapted to give an external indication of a speed limit violation;
   i. means for energizing said violation indicator by said source of electrical energy in response to the closing of said second or said fourth circuit closing elements; said means remaining energized when said circuit closing elements are therewith opened;
   j. a selector means having a first and a second position, said first group of circuit closing elements controlling said warning circuit and said violation indicator when said selector means is placed in said first position and said second group of circuit closing elements controlling said warning circuit and said violation indicator when said selector means is placed in said second position; and
   k. circuit breaking means in circuit with said violation indicator adapted to de-energize said violation indicator in response to a transmitted signal of a predetermined frequency.

2. The system in accordance with claim 1 wherein said means for energizing said violation indicator comprises:
   a. a first relay energized when second or said fourth circuit closing elements are closed; and
   b. a contact in said relay adapted to close a circuit to energize said violation indicator when said relay is energized, said circuit maintaining current through said relay when said second or fourth circuit closing element is open.

3. The system in accordance with claim 1 wherein said circuit breaking means comprises:
   a. a frequency to voltage converter;
   b. a second relay in circuit with said frequency to voltage converter energized when said frequency to voltage converter receives a signal of a pedetermined frequency; and
   c. a second contact within said circuit adapted to interrupt said circuit de-energizing said violation indicator when said second relay is energized.

4. The system in accordance with claim 1 further comprising a means to provide a visual indication to a driver of said motor vehicle that said motor vehicle is exceeding a speed limit.

5. The system in accordance with claim 1 further comprising a means mounted externally on said motor vehicle adapted to provide external indication that said selector means is placed in said second position.

6. The system in accordance with claim 1 further comprising a means to provide a visual indication to a driver of said motor vehicle that said selector means is placed in said second position.

7. The system in accordance with claim 1 wherein said selector means is a lever pivotably mounted to said motor vehicle.

8. A system in accordance with claim 7 further comprising a locking means for securing said lever when it is moved from said first and said second position, said locking means being responsive to the speed of said motor vehicle so that said motor vehicle must exceed a predetermined speed before said lever can be returned to said first position.

9. The system in accordance with claim 8 wherein said locking means comprises:
   a. a bracket mounted within said motor vehicle;
   b. a movable latch in said bracket in the path of said lever, said latch adapted to permit said lever to pass thereover as said lever is placed in said second position;
   c. biasing means for urging said latch into the path of said lever after said lever has been passed thereover to retain said lever on said bracket;
   d. means for withdrawing said latch from the path of said lever when said motor vehicle attains a predetermined speed to permit said lever to be returned to said first position.

10. The system in accordance with claim 9 wherein said means comprises:
    a. a fifth circuit closing element adapted to be opened or closed by said movable indicator; and
    b. a solenoid mounted on said bracket in circuit with said fifth circuit closing element adapted to withdraw said latch from the path of said lever when said circuit closing element is closed, and to return said latch into position when said circuit closing element is open.

11. In combination with a motor vehicle, a speed monitoring and ticketing system comprising:
    a. a speedometer fixedly mounted within said motor vehicle having a calibrated scale and a movable indicator adapted to visually indicate the speed of said motor vehicle by changing its position on said scale;
    b. a source of electrical energy within said motor vehicle;
    c. a first circuit closing element adapted to be opened and closed by said movable indicator;
    d. a second circuit closing element adapted to be opened and closed by said movable indicator, said first and second circuit closing elements forming a first group;
    e. a third circuit closing element adapted to be opened and closed by said movable indicator;
    f. a fourth circuit closing element adapted to be opened and closed by said movable indicator, said third and fourth circuit closing elements forming a second group, said first group being associated with a low speed limit and said second group being associated with a high speed limit;

g. a warning circuit energized by said source of electrical energy when said first or said third circuit closing element is closed;

h. a violation indicator mounted externally on said motor vehicle adapted to give an external indication of a speed limit violation;

i. means for energizing said violation indicator by said source of electrical energy in response to the closing of said second or said fourth circuit closing elements, said means remaining energized when said circuit closing elements are therewith opened;

j. a selector means having a first and a second position, said first group of circuit closing elements controlling said warning circuit and said violation indicator when said selector means is placed in said first position and said second group of circuit closing elements controlling said warning circuit and said violation indicator when said selector means is placed in said second position;

k. circuit breaking means in circuit with said violation indicator adapted to de-energize said violation indicator in response to a transmitted signal of a predetermined frequency;

l. a signal transmitting means positioned at predetermined locations along a roadway; and m. means for activating said signal transmitting means to activate said circuit breaking means thereby de-energizing said violation indicator.

* * * * *